United States Patent [19]

Gray

[11] 4,374,712
[45] Feb. 22, 1983

[54] CATHODE FOR CHLOR-ALKALI CELLS

[75] Inventor: Thomas J. Gray, Guilford, Conn.

[73] Assignee: Olin Corporation, New Haven, Conn.

[21] Appl. No.: 301,681

[22] Filed: Sep. 14, 1981

Related U.S. Application Data

[63] Continuation-in-part of Ser. No. 80,745, Oct. 1, 1979, which is a continuation-in-part of Ser. No. 25,153, Mar. 29, 1979, Pat. No. 4,240,895.

[51] Int. Cl.$^3$ .......................... C25B 1/34; C25B 11/06
[52] U.S. Cl. ...................................... 204/98; 204/252; 204/290 R; 204/293; 252/477 Q
[58] Field of Search ..................... 204/290 R, 293, 98, 204/252; 252/477 Q

[56] References Cited

U.S. PATENT DOCUMENTS

| | | | |
|---|---|---|---|
| 4,043,946 | 8/1977 | Sanker et al. | 252/466 J |
| 4,049,580 | 9/1977 | Oden et al. | 252/466 J |
| 4,248,679 | 2/1981 | Welch et al. | 204/98 |
| 4,248,680 | 2/1981 | Carlin et al. | 204/98 |
| 4,251,478 | 2/1981 | Welch et al. | 204/98 |

OTHER PUBLICATIONS

Shmonina et al., Chemical Abstracts, vol. 75, No. 25, abstract 151,100g.

Ewe et al., Electrchim. Acta., vol. 19, No. 12, pp. 799–808, 1974.

Primary Examiner—F. Edmundson
Attorney, Agent, or Firm—Arthur E. Oaks; Donald F. Clements

[57] ABSTRACT

An improved cathode with a conductive metal core and a Raney-type catalytic surface predominately derived from an adherent ternary aluminide intermetallic crystalline precursor outer portion of the metal core is disclosed. The precursor outer portion contains molybdenum and titanium to give a precursor alloy having the formula $Ni_xMo_yTi_zAl_3$ where x is within the range of from about 75 to about 94 weight percent, y is within the range of from about 5 to about 20 weight percent and z is within the range of from about 1 to about 5 weight percent of the Ni-Mo-Ti portion of the alloy. Also disclosed is a method of producing a low overvoltage cathode which includes the steps of taking a Ni-Mo-Ti core or substrate having about 5–20 weight percentage of Mo and about 1–5 weight percent Ti, coating it with aluminum then heat treating to form a Ni-Mo-Ti-Al tertiary alloy with mostly $NiAl_3$ (ordered orthorhombic) crystal structure. An alkali metal hydroxide is used to leach out Al and produce a ternary Ni-Mo-Ti alloy Raney surface. The resulting ternary alloy-coated substrate is useful as a cathode in electrolytic cells, particularly in membrane cells utilized to produce chlorine and caustic from brine.

16 Claims, 2 Drawing Figures

CATHODE FOR CHLOR-ALKALI CELLS

This application is a continuation-in-part of my copending application Ser. No. 080,745, filed Oct. 1, 1979, which is a continuation-in-part of Ser. No. 025,153, filed Mar. 29, 1979, now U.S. Pat. No. 4,240,895, which issued Dec. 23, 1980, which is incorporated herein by reference as if set forth herein at length.

FIELD OF INVENTION

The invention relates to an improved Raneyized hydrogen evolution cathode for chlor-alkali electrolytic cells.

PRIOR ART STATEMENT

In view of the phenomenal jump in energy costs and the increased scarcity of industrial fuel supplies, there has been and continues to be a flurry of research activity in the electrolysis field to find ways to reduce the amount of power used in electrolysis processes. For many years, it has been customary to use steel cathodes in chlor-alkali diaphragm cells, even though a substantial amount of power is used in overcoming what is called "hydrogen overvoltage" at the cathode. Hydrogen overvoltage is largely an inherent characteristic of the metallic surface in contact with the electrolyte so there is a continual need and desire to come up with better cathode surfaces to reduce this overvoltage and thereby decrease the power consumption of the cell.

It is known that active, porous nickel can be produced by selectively dissolving a soluble component, such as aluminum or zinc, out of an alloy of nickel and the soluble component. A porous nickel of this type and the alloy from which it is produced are generally called "Raney nickel" or "Raney alloy" after their inventor. See U.S. Pat. Nos. 1,563,787 (1925), 1,628,191 (1927) and 1,915,473 (1933). There are various methods for producing this Raney nickel, and various applications for this metal are known.

It is also known to use such Raney nickel surfaces on cathodes for chlor-alkali cells. For example, U.S. Pat. No. 4,116,804 filed Nov. 17, 1976, and issued Sept. 26, 1978, to C. Needes and assigned to DuPont de Nemours describes an electrode, hereafter "Needes electrode," for use as a hydrogen evolution cathode in electrolytic cells in which a cohesive surface layer of Raney nickel is in electrical contact with a conductive metal core having an outer layer of at least 15 percent nickel (see Table 4 thereof), characterized in that the surface layer of Raney nickel is thicker than 75 μm and has a mean porosity of at least 11 percent. The catalytic surface layer consists predominantly of $Ni_2Al_3$ grains from which at least 60 percent of aluminum has been leached out with an aqueous base. An overvoltage of about 60 millivolts is alleged. To phrase the same thing relative to conventional cathodes, reductions of 315 to 345 millivolts in hydrogen overvoltage as compared with mild steel cathodes is alleged. However, subsequent testing indicates much higher overvoltages and actual reductions of only 100-150 millivolts. Furthermore, spalling or delamination of the coating has been observed upon additional testing. The patent teaches that any Raney nickel which forms from the $NiAl_3$ phase is mechanically weak and does not adhere well and is generally lost during teaching. The patent also teaches that $Ni_2Al_3$ (Gamma phase) is the preferred intermetallic precursor and governs the activity of the coating and that the heat treatment should be such that the proportion of $Ni_2Al_3$ is maximized. This mechanical weakness of Raney nickel from $NiAl_3$ is unfortunate because it was previously known that Raney Ni from $NiAl_3$ (Beta phase) is more active for hydrogen desorption than is Raney Ni from $Ni_2Al_3$ (Gamma phase). See, for example, A. A. Zavorin et al., *Kinetika i Kataliz*, Vol. 18, No. 4, pp. 988-994, (USSR, July-August, 1977) which explains hydrogen is more weakly "bonded" in Raney Ni from $NiAl_3$ than from $Ni_2Al_3$, that there are more hydrogen adsorption centers in Raney Ni from $NiAl_3$ than $Ni_2Al_3$ and that the heat of desorption is lower for Raney Ni from $NiAl_3$ than $Ni_2Al_3$.

Golin, Karaseva and Serykh in *Elektrokhimiya*, Vol. 13, No. 7, pp. 1052-1056 (USSR, July, 1977) disclose a 10 percent Mo, 45 percent Ni, 45 percent Al alloy which, upon leaching, yields a Raney catalytic surface with extremely low activation energy for hydrogen oxidation such as would occur in a hydrogen-oxygen fuel cell. No mention of hydrogen evolution (i.e. hydrogen reduction) catalysis is given or suggested.

In addition, U.S. Pat. No. 3,673,116 which issued June 27, 1972, to Richter, discloses mixed Raney nickel catalysts of nickel, iron, and zirconium or titanium for use as a fuel cell electrode.

Other less pertinent prior art is discussed in my parent application, now U.S. Pat. No. 4,240,895 which issued Dec. 23, 1980.

SUMMARY OF THE INVENTION

The present invention provides an improved low overvoltage electrode for use as a hydrogen evolution cathode in an electrolytic cell, the electrode being of the type that has a Raney metal surface layer in electrical contact with a conductive metal core, wherein said improvement comprises a Raney metal surface which is predominantly derived from an adherent Ni-Mo-Ti-Al quaternary crystalline precursory outer portion of said metal core.

The invention further provides an improved low overvoltage electrode for use as a hydrogen evolution cathode in an electrolytic cell, the electrode being of the type that has a Raney metal surface layer in electrical contact with a conductive metal core, wherein the improvement comprises a Raney metal surface layer which is predominantly derived from adherent $(Ni_x Mo_y Ti_z)Al_3$ crystalline precursor surface layer, where x is less than 94, y is within the range of from about 5 to about 20 and z is within the range of from about 1 to about 5 weight percent of the Ni-Mo-Ti portion of the alloy.

The invention also provides an improved low overvoltage electrode for use in a hydrogen evolution cathode in an electrolytic cell, the electrode being of the type that has a Raney metal surface layer in electrical contact with a conductive metal core, wherein the improvement comprises a Raney metal surface which is derived from an adherent Ni-Mo-Ti-Al quaternary crystalline intermetallic layer stabilized by substitution of a stabilizing amount of molybdenum and titanium for some of the nickel in the crystalline structure of said crystalline layer.

The invention further provides a method of producing a low overvoltage electrode for use as a hydrogen evolution cathode in an electrolytic cell, which comprises the steps of:

(a) coating with aluminum the surface of a non-porous conductive base metal structure of an alloy comprised of about 5-20 weight percent molybdenum, about 1-5 weight percent Ti and about 75-94 weight percent nickel;

(b) heat treating said coated surface by maintaining said surface at a temperature of from 660° to 855° C. for a time sufficient to diffuse a portion of said aluminum into outer portions of said structure to produce an integral nickel-molybdenum-titanium-aluminum alloy layer in said outer portions comprised predominantly of $NiAl_3$ type grains, but insufficient to create a predominance of $Ni_2Al_3$ type grains in said outer portions; and (c) leaching out residual aluminum and intermetallics from the alloy layer until a Raney nickel-molybdenum-titanium exterior layer is formed integral with said structure.

This invention further provides an improved method of electrolyzing brine in an electrolytic cell to produce chlorine and caustic, wherein the cathode has an exterior surface comprised of a ternary Raney Ni-Mo-Ti alloy surface. This invention also provides a novel electrolytic cell containing such a cathode.

BRIEF DESCRIPTION OF THE DRAWINGS

The invention will be better understood by reference to the attached drawings which is provided by way of illustration and in which.

DETAILED DESCRIPTION OF PREFERRED EMBODIMENTS

Figure 1:
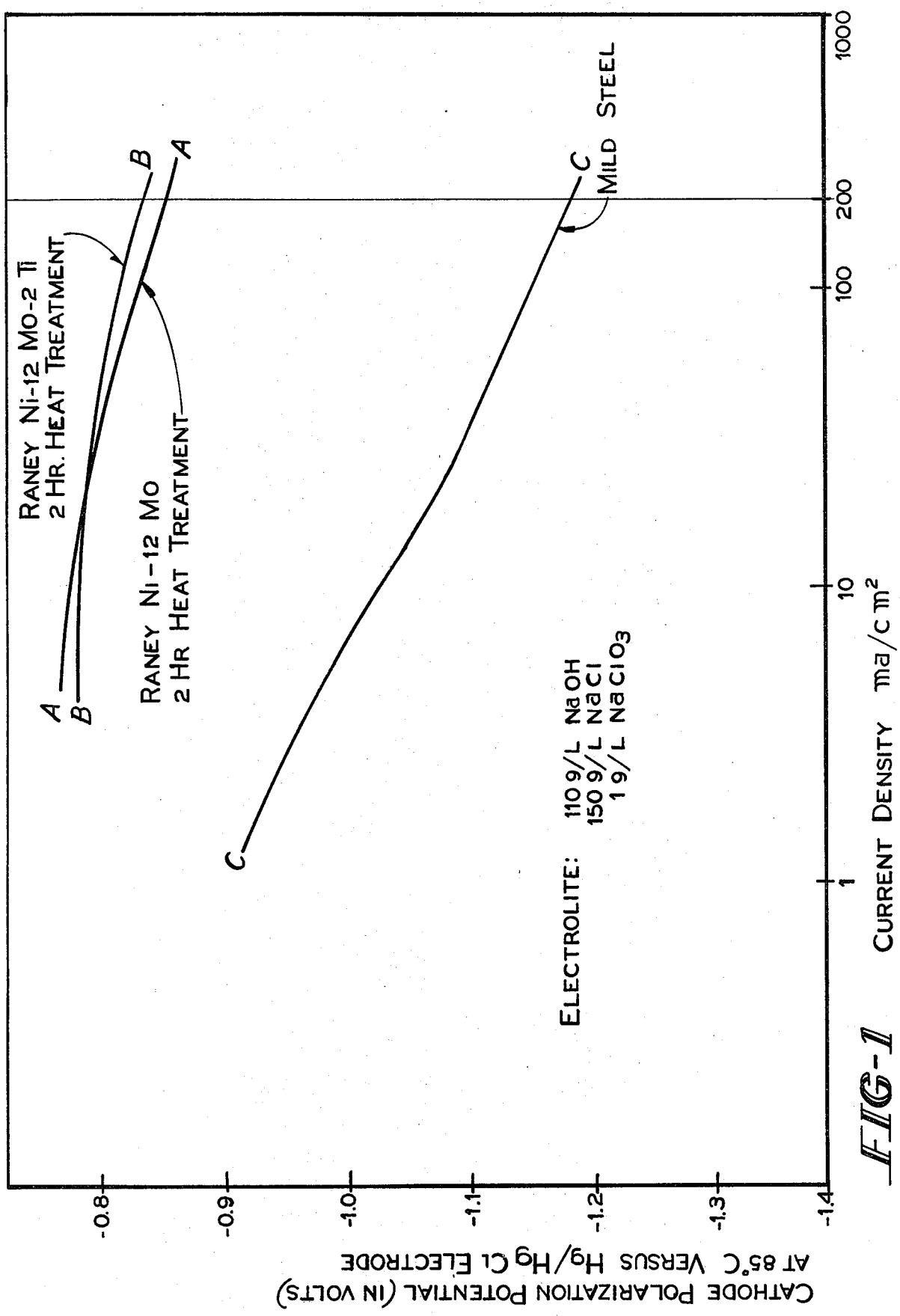
FIG. 1 is a graph of polarization potential versus time for a Raney Ni-Mo-Ti cathode of the present invention as compared with a Raney Ni-Mo cathode prepared according to the disclosure of my parent application now U.S. Pat. No. 4,240,895. A comparison with mild steel is also made.

FIG. 1 shows the overpotential curves versus current density for two catalytically coated cathodes, that of the present invention (Curve B—B) and that of the invention of the '895 Patent (Curve A—A) both prepared similarly from Beta phase precursor. Each has identical percent by weight of molybdenum (12%) and the same method (dipping) of depositing the aluminum prior to identical heat treatment for two hours at 725° C. However, the cathode of the present invention has 2 percent by weight of added titanium. The addition of 2 percent Ti was found to produce, upon subsequent Raney treatment, a β-Raney Ni-12Mo-2Ti cathode coating having about 50 millivolts less hydrogen overvoltage than that exhibited by a β-Raney Ni-12Mo cathode coating at a current density of 200 milliamps/cm$^2$. The test method was the same as in the '895 Patent. A comparison was also made with a mild steel cathode as shown by line C—C. It seems clear that the difference in titanium content was responsible for the difference in potential since all other parameters of the comparative test were identical.

It is also noted that, as with added molybdenum alone, an unexpected and surprising result is achieved when both molybdenum and titanium are added to a Beta phase ($NiAl_3$) intermetallic. The Beta phase formation is stabilized by the addition of molybdenum and titanium in the amount of about 5-20 percent by weight and about 1-5 percent by weight, respectively, of the total weight of nickel, titanium and molybdenum. That is, the titanium does not harm this "Beta-stabilizing" effect of the molybdenum. Both molybdenum and titanium are apparently captured in the ordered orthorhombic Beta phase crystal structure such that the Beta phase can be represented by the formula $(Ni_xMo_yTi_z)Al_3$ where x, y, and z are the weight percent nickel, molybdenum and titanium, respectively, in the total weight of nickel, titanium and molybdenum. By "stabilized" is meant that once the Beta phase forms it has less of a tendency to transform to a Gamma phase ($Ni_2Al_3$) crystal structure and thus the elevated heat treatment temperature can last longer without as much undesirable Gamma phase being formed. In fact, the heat treatment at the optimum temperature of 725° C. can last from about 2 hours to about 6 hours, and still produce a β-Raney Ni-Mo-Ti cathode. A heat treatment period of two hours was used on the samples in FIG. 1. Since it was shown in the '895 Patent that the Beta phase is the intermetallic of choice, this is an important advantage of the Ni-Mo-Ti-Al quaternary alloy over Ni-Al binary alloys.

One preferred electrode is a monolithic structure of a Ni-Mo-Ti alloy of 5-20 percent and preferably from about 10-16 percent by weight molybdenum and about 75-94 percent and preferably from about 80-88 percent by weight nickel, and from about 2-4 percent by weight titanium. This structure has been given a Raney treatment by dipping in molten aluminum and heating for about 1-360 minutes in an inert atmosphere at a temperature of from about 660° C. to about 855° C. to produce a Beta phase crystal structure. A temperature of about 660° C. to about 750° C. and a time of about 1-30 or even 5-15 minutes are more preferred because this gives sufficient time for enough aluminum to interdiffuse into the nickel to provide maximum preponderance of $NiAl_3$ (Beta phase) over $Ni_2Al_3$ (Gamma phase), but does not allow enough time for the diffusion to result in the preponderance of undesirable $Ni_2Al_3$ (Gamma phase) as is specifically called for in U.S. Pat. No. 4,116,804.

Contrary to the disclosure of U.S. Pat. No. 4,116,804, it has been surprisingly found that the Beta phase $NiAl_3$, with molybdenum and titanium added thereto, is not lost during leaching and in fact experiences no appreciable thinning during subsequent use in a chlor-alkali cell.

The inclusion of from about 1 to about 5 percent by weight titanium in the Ni-Mo alloy in order to produce a Ni-Mo-Ti ternary alloy has given a further surprise in that a further reduction of 50 millivolts overvoltage (at 200 ma/cm$^2$) in cathode overvoltage is achieved. Since the Raney Ni-Mo alloy coating already exhibited such a low overvoltage, it is most surprising that any additional lowering occurred from added titanium.

The thickness of the porous Ni-Mo-Ti exterior surface of the electrode generally is less than about 75 microns and preferably ranges from about 30 to about 60 microns. Following leaching with alkali metal hydroxide, the aluminum content of the exterior surface has been reduced by at least about 65 percent, and preferably by from about 75 to about 95 percent by weight.

Advantageous use can be made of the electrodes of the invention, especially as hydrogen-evolution cathodes of cells intended for the electrolysis of brine, water or the like. The electrodes are particularly preferred for use in brine electrolysis cells, wherein the high electrochemical activity of the β-Raney nickel-titanium-molybdenum surface remains constant for long periods of extended continuous use. When the electrode is intended for use in a brine-electrolysis diaphragm cell, the diaphragm can be applied directly to the porous nickel surface of the electrode as noted in the '895 Patent.

Figure 2:
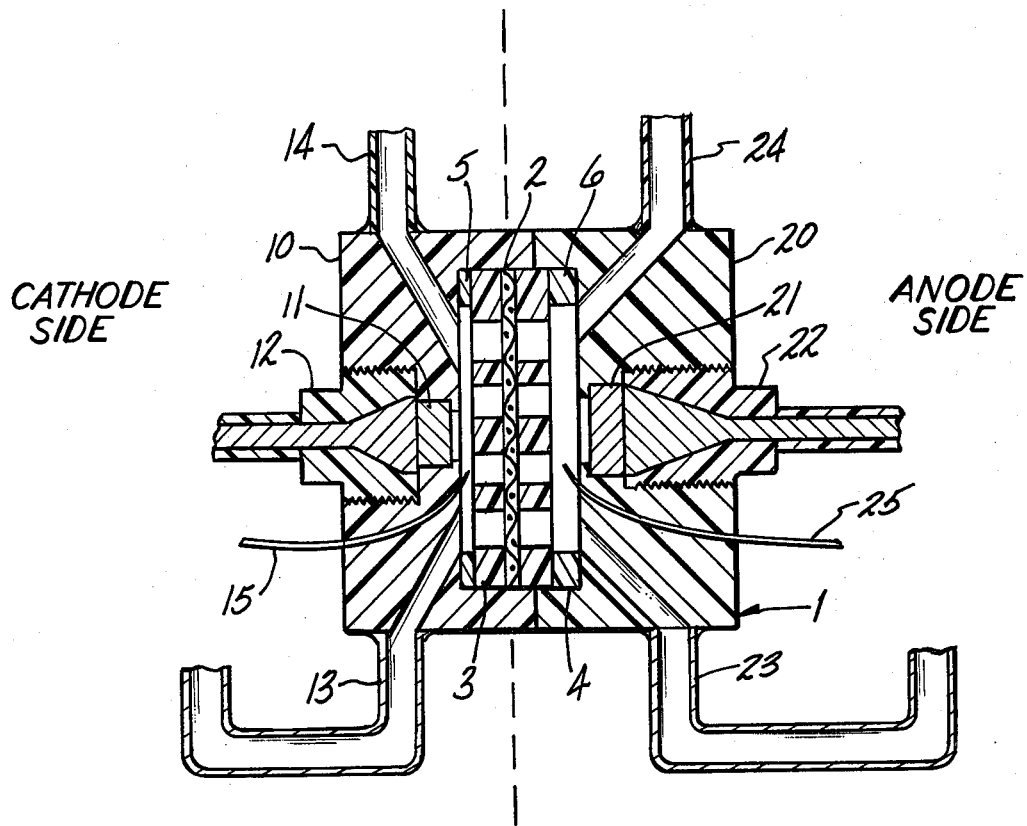
FIG. 2 is a sectional schematic view of a typical test cell useful in the preparation of sodium hydroxide and chlorine from salt brine.

FIG. 2 is a sectional schematic diagram of an electrochemical test cell, used for measuring the cathode potentials of the various cathode electrodes of the examples below.

Test cell 1, made of tetrafluoroethylene ("TFE"), is divided by membrane 2 into two chambers, cathode chamber 10 and anode chamber 20. Membrane 2, which is placed between two TFE separators 3 and 4 sealed in place by caustic resistant gaskets 5 and 6, respectively, is made of a homogeneous film 7 miles thick of 1200 equivalent weight perfluorosulfonic acid resin which has been chemically modified by ethylene diamine converting a depth of 1.5 mils to the perfluorosulfonamide laminated with a "T-12" tetrafluoroethylene filament fabric, marketed by the DuPont Company under the trademark Nafion ® 227.

A circular titanium anode 21 of two square centimeters area coated with a titanium oxide-ruthenium oxide mixed crystal is installed at the end of the anode current collector 22 in anode chamber 20. Cathode 11 of test cell 1 is installed at the end of cathode current collector 12 in cathode chamber 10. Perforated tetrafluoroethylene separators 3 and 4 and gaskets 5 and 6 are placed between membrane 2 and anode 21 and cathode 11, respectively.

A circular area of one square cemtimeter of the porous Raney nickel alloy surface of the test cathode 11 is exposed to the interior of cathode chamber 20. Cathode 11 and anode 21 are connected electrically to controllable voltage source by cathode current collector 12 and anode current collector 22. An ammeter (not shown) is connected in the line between the two electrodes. The entire cell 1 is then immersed in a liquid bath which is thermostatically controlled to give a constant operating temperature of about 85° C.

Catholyte, consisting of an aqueous solution containing about 11 weight percent sodium hydroxide, 15 weight percent sodium chloride and 0.1 weight percent sodium chlorate, (thereby simulating a diaphragm cell electrolyte), is pumped through inlet 13 into the cathode compartment at a rate which establishes an overflow through outlet 14. The catholyte is maintained at 85° C. Similarly, anolyte consisting of an aqueous brine solution having a pH of about 1.5 and containing 24–26 weight percent sodium chloride, is pumped through inlet 23 into the anode compartment and overflowed through outlet 24. The salt concentrations of the catholyte and anolyte are typical of that encountered in commercial diaphragm cells used in the electrolysis of brine. The use of separate catholyte and anolyte feeds, rather than a single brine feed, assures better control of the desired catholyte composition. The catholyte and anolyte flows are controlled so that there is a small flow of solution from the anode to the cathode compartment, which flow is sufficient to assure ionic conductivity across the cell, but insufficient to significantly affect the catholyte composition.

Luggin tetrafluoroethylene capillary 15, installed in the cathode chamber 10 and Luggin capillary 25, installed in the anode chamber 20 are positioned ½ mm from the membrane surface and are each connected to a respective mercury-mercury oxide reference electrode or "S.H.E." (not shown), which in turn is connected through voltmeter (not shown) to the other electrode of cell 10. A Luggin capillary is a probe which, in making ionic or electrolytic contact between the anode or cathode and the reference electrode, minimizes the voltage drop due to solution resistance and permits direct measurement of the anode or cathode potential with respect to the reference electrode.

To determine the cathode potential of a test electrode, a voltage is impressed between the anode and test cathode, such that a current density of 200 ma/cm$^2$ is established at the cathode. The current density is the current measured by the ammeter in milliamps divided by the area (i.e., 1 cm$^2$) of the porous Raney nickel alloy surface of the test electrode exposed to catholyte. Thus 200 ma would be applied to cathode 11 to achieve a current density of 200 ma/cm$^2$. Hydrogen gas, generated at the cathode is removed from the cathode compartment through catholyte outlet 14. Chlorine gas, generated at anode 21, is similarly removed through anolyte outlet 24. The cell is operated in this manner for at least 2 hours prior to reading the cathode potential directly from the voltmeter.

Although the test cell was operated with porous cation exchange resin, the electrode of this invention is also useful in electrolytic cells which utilize diaphragms as well as liquid impermeable cation exchange membranes. Membranes which are useful in electrolytic cells for the electrolysis of brine which employ the novel cathode having the Raney nickel alloy surface described above, include perfluorosulfonic acid resins which are preferably hydrolyzed copolymers of a fluorinated vinyl compound and fluorosulfonated perfluorovinyl ether. Suitable fluorinated vinyl compounds include vinyl fluoride, hexafluoropropylene, vinylidene fluoride, trifluoroethylene, chlorotrifluoroethylene, perfluoro(alkylvinyl ether), tetrafluoroethylene and mixtures thereof. Preferred fluorinated vinyl compounds are tetrafluoroethylene and hexafluoropropylene, with tetrafluoroethylene being particularly preferred.

The fluorosulfonated perfluorovinyl ethers are compounds of the formula $CF_2=CFOR_fSO_2F$ wherein $R_f$ is a bifunctional perfluorinated radical comprising one to eight carbon atoms. The $R_f$ radical of the formula above can be either branched or unbranched, i.e., straight chain and can have one or more ether linkages.

Illustrative of such fluorosulfonated perfluorovinyl ethers are:

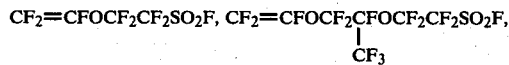

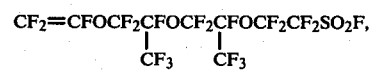

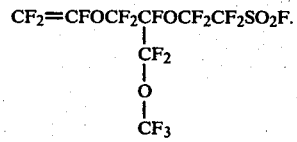

The most preferred fluorosulfonated perfluorovinyl ether is perfluoro(3,6-dioxa-4-methyl-7-octenesulfonyl fluoride),

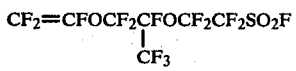

The fluorosulfonated perfluorovinyl ethers are disclosed in such references as U.S. Pat. No. 3,282,875, to Connolly et al.; U.S. Pat. No.3,041,317, to Gibbs et al.; U.S. Pat. No. 3,560,568, to Resnick; and U.S. Pat. No. 3,718,627, to Grot.

The hydrolyzed copolymers are prepared by general polymerization techniques developed for homo- and copolymerizations of fluorinated ethylenes, particularly those employed for tetrafluoroethylene which are described in the literature.

The $FSO_2$ group of the solid persulfonic acid resin is converted to an $SO_3H$ group or a sulfonate group (such as an alkali metal sulfonate) or a mixture thereof. The equivalent weight of the perfluorocarbon copolymer ranges from about 900 to about 1,600 and preferably from about 1,100 to about 1,500. The equivalent weight is defined as the average molecular weight per sulfonyl group.

Perfluorosulfonic acid resins used as membranes may also contain substituents such as primary amines described, for example, in U.S. Pat. No. 4,085,071, issued on Apr. 18, 1978, to P. R. Resnick or polyamines as described, for example, in U.S. Pat. No. 4,030,988, issued June 21, 1977, to W. G. Grot.

Typically, perfluorosulfonic acid resin membranes suitable for electrolytic processes are homogeneous films having a thickness in the range of from about 1 to about 10 mils. For increased mechanical strength, the films are often combined, for example, by lamination with a support material. Fabrics of perfluoroolefins such as polytetrafluoroethylene material are commonly used as support materials.

Other suitable membranes are the carboxylic acid type such as described in U.S. Pat. No. 4,065,366 which issued to Yoshio Oda et al. on Dec. 27, 1977. In this patent, carboxylic acid substituted polymers are prepared by reacting a fluorinated olefin with a comonomer having a carboxylic acid group or a functional group which can be converted to a carboxylic acid group.

The fluroinated olefin monomers and the comonomers having carboxylic acid group or a functional group which can be converted to carboxylic acid group for using the production of the copolymer for the membranes can be selected from the defined groups below.

It is preferable to use monomers for forming the units (a) and (b) in the copolymers.

$$\text{+CF}_2\text{—CXX'+} \quad \text{(a)}$$

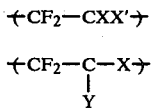  (b)

wherein X represents —F, —Cl, —H or —$CF_3$ and X' represents —F, —Cl, —H, —$CF_3$ or $CF_3(CF_2)_m$—; m represents an integer of 1 to 5 and Y represents —A, —$\phi$—A, —P—A, —O—$(CF_2)_n$(P,Q,R—A; P represents —$CF_2)_a(CXX')_b(CF_2)_c$; Q represents —$CF_2$—O—$CXX')_d$; R represents —$CXX'$—O—$CF_2)_e$; (P,Q,R) represents a discretional arrangement of at least one of P, Q and R: $\phi$ represents phenylene group; X,X' are defined above; n=0 to 1; a, b, c, d, and e represent 0 to 6; A represents —COOH or a functional group which can be converted to —COOH by hydrolysis or neutralization such as —CN, —COF, —$COOR_1$, —COOM, —$CONR_2R_3$; $R_1$ represents a $C_{1-10}$ alkyl group; M represents an alkali metal or a quaternary ammonium group and $R_2$ and $R_3$, respectively, represent hydrogen of a $C_{1-10}$ alkyl group.

The typical groups of Y have the structure having A connected to carbon atom which is connected to a fluorine atom, and include

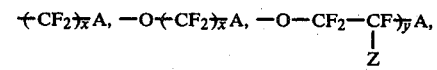

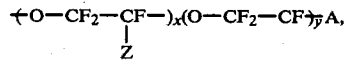

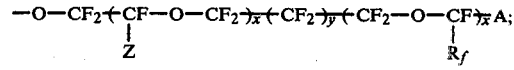

wherein x, y and z, are respectively, 1 to 10; Z and $R_f$ respectively, represent —F and a $C_{1-10}$ perfluoroalkyl group A is as defined above. In the case of the copolymers having the units (a) and (b), it is preferable to have 1 to 40, especially 30 to 20 mole percent of the unit (b) in order to produce the membrane having an ion-exchange capacity in said range. The molecular weight of the fluorinated copolymer is important because it relates to the tensile strength, the fabricability, the water permeability and the electrical properties of the resulting fluorinated cation exchange membrane.

Typical carboxylic acid polymers include copolymer of tetrafluoroethylene and

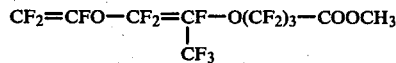

copolymerized with a catalyst of azobisisobutyronitrile in trichlorofluoroethane to obtain a fluorinated copolymer having an ion exchange capacity of about 1.17 meq/g polymer and a $T_g$, glass transition temperature, of 190° C. press-molded to form a film about 200 microns thick and thereafter hydrolyzed in an aqueous methanol solution of sodium hydroxide, (b) a copolymer of tetrafluoroethylene and $CF_2$=CFO—$(CF_2)_3$—$COOCH_3$ copolymerized with a catalyst of azobisisobutyronitrile to obtain a fluorinated copolymer having an ion exchange capacity of about 1.45 meq/g polymer and a $T_g$ of about 235° C., press-molded to form a film of thickness about 200 microns and hydrolyzed in an aqueous methanol solution of sodium hydroxide, (c) a copolymer of tetrafluoroethylene and

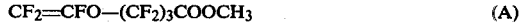   (A)

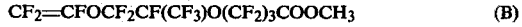   (B)

copolymerized with a catalyst of azobisisobutyronitrile (mole ratio A/B of about 4:1) to obtain a fluorinated copolymer having an ion exchange capacity of about 1.45 meq/g polymer and $T_g$ of about 220° C., press-molded to obtain a film of about 200 microns thickness, and hydrolyzed in an aqueous methanol solution of sodium hydroxide, and (d) a copolymer of tetrafluoroethylene and $CF_2$=$CFO(CF_2)_3COOCH_3$ were copolymerized with a catalyst of ammonium persulfate in water to obtain a fluorinated copolymer having an ion exchange capacity of 1.20 meq/g polymer and $T_g$ of 210° C., the copolymer extruded to obtain a film having a thickness of 250 microns and width of 15 centimeters and plied to a cloth made of a copolymer of tetrafluoroethylene and ethylene (50 mesh:thickness 150 microns), compress-molded to form a reinforced film and hydrolyzed in an aqueous methanol solution of sodium hydroxide to obtain a carboxylic acid type fluorinated cation exchange membrane.

Other suitable carboxylic acid type membranes are disclosed in South African Pat. No. 782225, which issued to David Charles England on Apr. 4, 1978, and U.S. Pat. No. 4,255,240, which issued on Mar. 10, 1981, to Molnar et al.

For selected laminated membranes, a laminated inert cloth supporting fabric may be employed. The thickness of the laminated inert cloth supporting fabric is in the range of from about 3 to about 7 and preferably from about 4 to about 5 mils. The inert supporting fabric is typically comprised of polytetrafluoroethylene, rayon, or mixtures thereof.

In each of the examples, electrodes are prepared and tested as cathodes in brine electrolysis test cells. All characterizations are carried out in accordance with the test procedures described above. Unless stated otherwise, all compositions are given as weight percentages.

EXAMPLE A

Three electrodes were prepared as follows:
1. Mild Steel.
A thoroughly cleaned mild steel coupon.

2. B-Raney Ni-Mo-Ti on Ni-Mo-Ti core (dipped). A 1.6 mm thick Ni-Mo-Ti alloy sheet, assaying Ni 0.86, Mo 0.12, Ti 0.02 is cut into a coupon measuring about one $cm^2$. The coupon which is to become the core of the electrode is thoroughly cleaned by degreasing with acetone, lightly etching with 10 percent HCl, rinsing with water and after drying, grit blasting with No. 24 grit $Al_2O_3$ at a pressure of 3.4 kg/$cm^2$ (50 psi).

The cleaned nickel alloy coupon is aluminized by applying a commercial flux and then dipping in a pot of molten aluminum for a sufficient time to entirely coat the coupon with aluminum.

The aluminized nickel alloy coupon is heat treated at 725° C. for 10 minutes in a nitrogen atmosphere to interdiffuse the nickel and aluminum and form a layer which is predominantly Gamma phase ($Ni_2Al_3$) nickel aluminide. After heat treating, the coupon is allowed to cool in a current of nitrogen for about 2 hours. This produces a predominantly $NiAl_3$ interdiffused layer.

The cooled coupon is then subjected to a caustic leaching treatment wherein the aluminum is selectively removed from the interdiffused layer to leave an active porous Raney nickel alloy surface on the coupon. The leaching treatment consists of immersing the interdiffused coupon in 10 percent NaOH for 20 hours, without temperature control, followed by 2 hours in 30 percent NaOH at 80° C. The coupon was then rinsed with water for 30 minutes.

3. β-Raney Ni-12Mo on Ni-12Mo core (dipped). A 1.6 mm thick sheet of an alloy assaying at least 86 percent nickel and 12.0±0.1 percent Mo (Ni-12Mo) is cut into a circular coupon measuring about one $cm^2$. The coupon which is to become the core of the electrode is thoroughly cleaned by degreasing with acetone, lightly etching with 10 percent HCl, rinsing with water and after drying, grit blasting with No. 24 grit $Al_2O_3$ at a pressure of 3.4 kg/$cm^2$ (50 psi).

The cleaned nickel-molybdenum coupon is aluminized by applying a commercial flux and then dipping in a pot of molten aluminum for a sufficient time to entirely coat the coupon with aluminum.

The aluminized nickel-molybdenum coupon is heat treated at 725° C. for 10 minutes in a nitrogen atmosphere to interdiffuse the nickel and aluminum and form a layer which is predominantly Gamma phase ($Ni_2Al_3$) nickel aluminide. After heat treating, the coupon is allowed to cool in a current of nitrogen for about 2 hours. This produces a predominantly $NiAl_3$ interdiffused layer.

The cooled coupon is then subjected to a leaching treatment wherein the aluminum is selectively removed from the interdiffused layer to leave an active porous nickel-molybdenum surface on the coupon. The leaching treatment consists of immersing the interdiffused coupon in 10 percent NaOH for 20 hours, without temperature control, followed by 2 hours in 30 percent NaOH at 80° C. The coupon is then rinsed with water for 30 minutes.

Each coupon was tested as cathode 11 in test cell 1 of FIG. 2 in accordance with the above-described procedure.

The cathode potentials are monitored for 45 days to determine if the potential experienced a steady increase or instead leveled out at some value.

The results are plotted in FIG. 1. It is seen that Raney Ni-12Mo-2Ti of coupon 2 had a surprising lower hydrogen overvoltage than the Raney Ni-12Mo alloy of coupon 3 and the mild steel of coupon 1.

What is desired to be secured by Letters Patent is:

1. In an electrolytic cell useful for the electrolysis of brine to produce chlorine and an alkali metal hydroxide, said cell being comprised of an anode, a cathode, and a cationic exchange separator positioned between said anode and cathode, characterized by the improvement which comprises employing as said cathode a conductive metal core having a Raney metal surface predominantly derived from an integral Beta structured ($Ni_x$-$Mo_yTi_z$)$Al_3$ quaternary intermetallic crystalline precursory outer surface which adheres to said metal core, where x is less than 94, y is within the range from about 5 to about 20 and z is within the range from 1 to about 5 weight percent of the Ni-Mo-Ti molecular portion.

2. The electrolytic cell of claim 1 wherein x is in the range from about 80 to about 88, y is within the range from about 10 to about 16 and z is in the range from about 2 to about 4 weight percent of the Ni-Mo-Ti molecular portion.

3. The electrolytic cell of claim 1 or 2 wherein said conductive metal core is an alloy containing from about 80 to about 95 percent by weight of nickel, from about 5 to about 20 percent by weight of molybdenum and from about 1 to about 5 percent by weight of titanium.

4. The electrolytic cell of claim 1 or 2 wherein the thickness of said Raney nickel surface is less than about 75 microns.

5. The electrolytic cell of any one of claims 1-4 wherein said cation exchange separator is a membrane selected from the group consisting of perfluorosulfonic acid resins and perfluorocarboxylic acid resins.

6. The electrolytic cell of claim 5 wherein said cation exchange separator is a perfluorosulfonic acid resin.

7. The electrolytic cell of claim 5 wherein said cation exchange separator is a perfluorocarboxylic acid resin.

8. The electrolytic cell of claims 5, 6, or 7 wherein said cation exchange separator is impervious to the flow of liquids.

9. In a method for the electrolysis of brine to produce chlorine and an alkali metal hydroxide wherein an electric current is passed between an anode and a cathode in said cell containing an aqueous brine electrolytic and said anode is separated from said cathode by means of a cationic exchange separator characterized by the improvement which comprises employing as said cathode a conductive metal core having a Raney metal surface predominantly derived from an integral Beta structured $(Ni_xMo_yTi_z)Al_3$ quaternary intermetallic crystalline precursory outer surface which adheres to said metal core, where x is less than 94, y is within the range from about 5 to about 20 and z is within the range from 1 to about 5 weight percent of the Ni-Mo-Ti molecular portion.

10. The method of claim 9 wherein x is in the range from about 80 to about 88, y is in the range from about 10 to about 16 and z is in the range from about 2 to about 4 weight percent of the Ni-Mo-Ti molecular portion.

11. The method of claim 9 or 10 wherein said conductive metal core is an alloy containing from about 80 to about 95 percent by weight of nickel, from about 5 to about 20 percent by weight of molybdenum and from about 1 to about 5 percent by weight of titanium.

12. The method of claim 9 or 10 wherein the thickness of said Raney nickel surface is less than about 75 microns.

13. The method of any one of claims 9-12 wherein said cation exchange separator is a membrane selected from the group consisting of perfluorosulfonic acid resins and perfluorocarboxylic acid resins.

14. The method of claim 13 wherein said cation exchange separator is a perfluorosulfonic acid resin.

15. The method of claim 13 wherein said cation exchange separator is a perfluorocarboxylic acid resin.

16. The method of claim 13, 14, or 15 wherein said cation exchange separator is impervious to the flow of liquids.

* * * * *